Nov. 13, 1923.
G. KOHLER ET AL
ANCHORAGE UNIT
Filed June 1, 1921
1,474,154
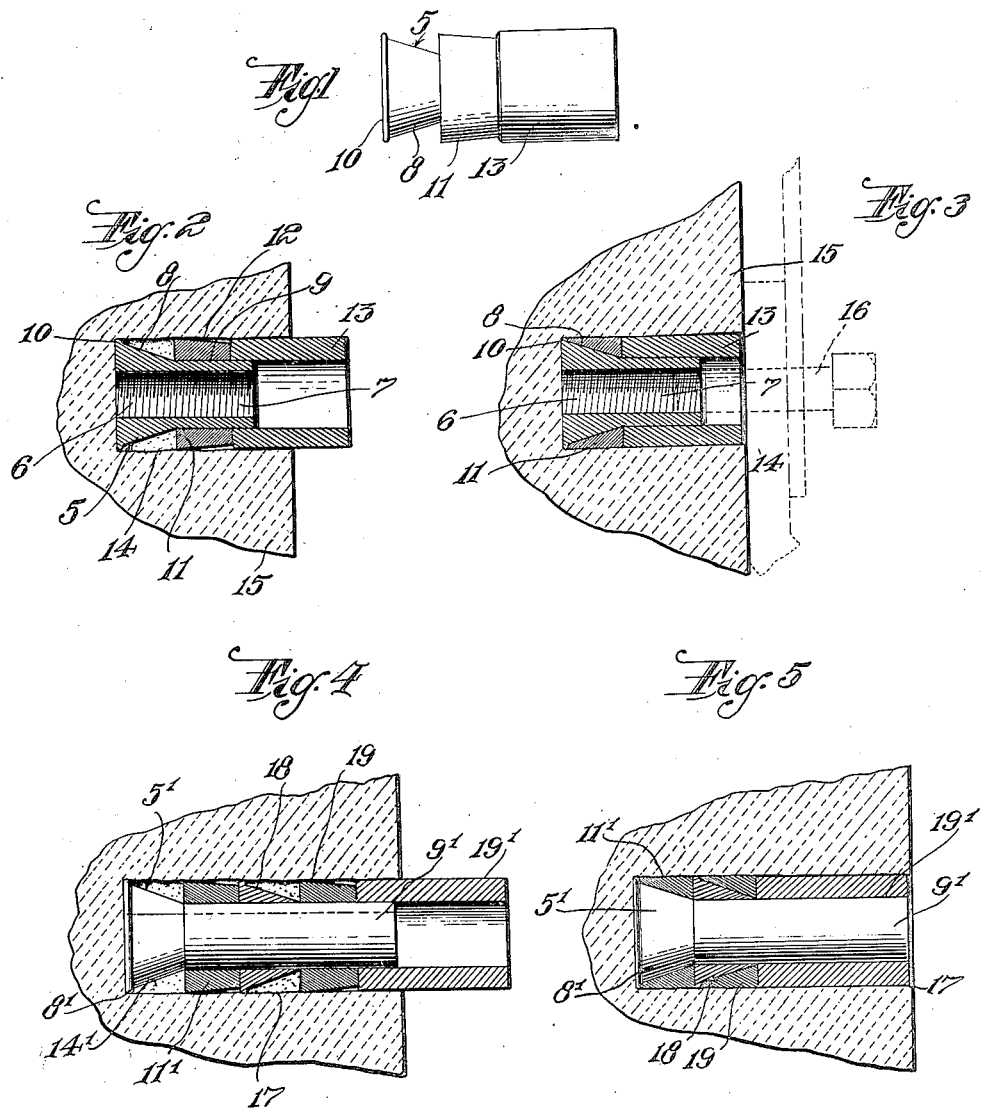
INVENTORS
Gottfrid Kohler and
BY Charles B. Smith
C. P. Goefiel
ATTORNEY Patented Nov. 13, 1923.

1,474,154

UNITED STATES PATENT OFFICE.

GOTTFRID KOHLER, OF BRIDGEPORT, CONNECTICUT, AND CHARLES B. SMITH, OF SEATTLE, WASHINGTON, ASSIGNORS TO CINCH EXPANSION BOLT & ENGINEERING COMPANY, OF NEW YORK, N. Y., A CORPORATION OF NEW YORK.

ANCHORAGE UNIT.

Application filed June 1, 1921. Serial No. 474,237.

*To all whom it may concern:*

Be it known that we, GOTTFRID KOHLER and CHARLES B. SMITH, citizens of the United States, and residents of the city of Bridgeport, county of Fairfield, State of Connecticut, and city of Seattle, county of Kings, and State of Washington, respectively, have invented certain new and useful Improvements in Anchorage Units, of which the following is a specification.

This invention relates to an improved anchorage unit for the purpose of anchoring bolts, screws, or analogous fastening or securing elements in masonry.

The invention has for its primary object to provide an anchorage unit of that type wherein there is employed an expanding member of steel, brass or other relatively hard metal and an expansion member of comparatively soft ductile metal, such as lead, the said unit including as one of its component parts, a ram adapted upon impact, to effect the complete expansion of said expansion member radially in all directions and to cause said expansion member to become moulded in the wall of the recess or aperture in the masonry structure and completely fill the crevices and irregularities therein.

In one embodiment of the invention, we provide an expanding member of hard metal having a threaded bore and a tapering exterior surface at one of its ends, the remaining exterior surface of said member extending in parallel relation to the bore. Upon this latter portion of the expanding member the soft metal expansible sleeve or collar is loosely engaged and finally, a hard metal tubular ram is frictionally engaged upon the end of the expanding member so as to retain the expansion sleeve thereon. The three component parts of the unit are positioned in the recess or aperture in the masonry and it is then only necessary to strike the outer end of the ram several blows with a hammer to drive the expanding sleeve upon the tapering surface of the expanding member and cause the sleeve to become securely anchored to the wall of the recess. The bolt, screw or other attaching element may then be threaded into the bore of the expanding member and properly adjusted to secure a desired part in place. In another embodiment of our invention, we may provide the expanding member with a straight cylindrical portion of greater length and arrange thereon a second expanding member of hard metal in the form of a sleeve having an exterior tapering or conical surface and also a second expansion member to coact with said expanding sleeve. The metal ram is then frictionally engaged over the end of the expanding member against the latter expansion member. In this construction, the two expansion members are simultaneously driven upon the tapering surfaces of the expanding members by the impact delivered against the end of the ram and caused to closely unite with the wall of the recess or aperture in the masonry at spaced points. This construction is employed only in cases where the anchorage device must resist extraordinary severe pull or strain. In both cases, however, it will be understood that the several parts, including the ram, are assembled in a complete unit and applied together within the recess or aperture in the masonry. In this way we avoid the necessity of employing a separate ramming tool or of handling the separate parts of the anchorage device or unit and individually assembling the same in co-operative relation. It is obvious, therefore, that the device may be applied and the bolt or screw receiving element securely anchored in position in less time than has heretofore been required in the application of similar devices.

It is also an object of our present improvement to provide an anchorage device of this character in which the bolt or screw need not be assembled with the other parts of the unit in applying the device but can be subsequently connected to the expanding member after the latter has been securely anchored in place.

With the above and other objects in view, the invention consists in the improved form, construction and relative arrangements of the several parts as will be hereinafter more fully described, illustrated in the accompanying drawings and subsequently incorporated in the subjoined claims.

In the drawings wherein similar reference characters designate corresponding parts throughout the several views:

Figure 1 is an elevation illustrating one embodiment of the improved anchorage unit with the several parts thereof assembled;

Figure 2 is a sectional view showing the unit arranged in the recess or aperture in the masonry before the same is anchored in place;

Figure 3 is a similar view illustrating the relative positions of the parts after the expanding member has been securely anchored in the recess or aperture;

Figure 4 is a view similar to Figure 2, and

Figure 5 is a view similar to Figure 3, illustrating a slightly modified embodiment of the invention.

Referring in detail to the drawing, 5 designates the expanding member which is formed of steel, brass or other relatively hard metal. This member has a bore 6 extending longitudinally therethrough and preferably, though not necessarily, threaded for its entire length, as shown at 7. At one of its ends the expanding member 5 is provided with an exterior tapering or conical surface 8. At its smaller diameter this conical surface merges into the cylindrical surface 9 extending longitudinally of the remaining portion of the expanding member in parallel relation to the axis thereof. The member 5 is further provided upon its conical end portion at the extremity of the surface 8 with a circumferential flange 10.

Upon the cylindrical surface 9 of the expanding member, the expansion member or sleeve 11 is loosely engaged. This sleeve is formed from a soft ductile metal, preferably lead and is of a length substantially equivalent to the length of the tapering or conical surface 8 of the expanding member. The inner surface of the expansion member 11 is parallel with the cylindrical surface 9 of the expanding member while its outer peripheral surface slightly tapers longitudinally, as at 12, though in less degree than the tapering or conical surface 8 of the expanding member.

It will be noted that when the expanding sleeve is arranged upon the cylindrical portion of the expanding member, with its larger end opposed to the smaller end of the tapering portion 8 of said expanding member, said expanding member projects an appreciable distance beyond the other end of the expansion sleeve. Upon this projecting end of the expanding member 5, a tubular ram 13 of hard metal is engaged. While this ram, under impact, may be driven longitudinally upon the expanding member, its internal diameter is such that it has a more or less tight frictional contact with the peripheral face 9 of the expanding member so as to offer sufficient frictional resistance to prevent its casual disconnection from the end of the expanding member.

The anchorage unit is supplied to the user with its several component parts assembled as above explained. In use, a recess or aperture 14 of predetermined depth is formed in the face of the masonry, indicated at 15. The anchorage unit is then inserted in said recess with the conical or tapering end of the expanding member 5 engaged against the base wall of the recess as seen in Figure 2. The diameter of the flange 10 at the extremity of this tapering portion of the expanding member is substantially equal to the diameter of the opening or recess 14 within which the unit is placed. The ram 13 projects for substantially half its length beyond the face of the masonry wall. By means of a hammer or other suitable tool, one or more blows are delivered against the end of this ram, the impact being transmitted to the soft metal expansion member 11, which is driven longitudinally upon the tapering or conical surface 8 of the expanding member. The ductile expansion member will readily yield or expand under the radial stress thus produced and under the pressure exerted by the ram is tightly forced or moulded into the crevices or irregularities in the longitudinal surface of the recess or aperture 14. It has been found in practice that by forming the expansion member of lead, the metal under the action of the expanding force in effect will become homogeneously united with the masonry wall structure to such an extent that the anchored expanding member will successfully resist very severe pulling strains.

After the member 5 has been securely anchored in the recess or aperture 14, the bolt or screw 16 for attaching or securing the desired part to the wall is then threaded into the bore 6 of the expanding member. This bore is of sufficient length to permit of the adjustment or take-up of the bolt 16 which may become necessary due to atmospheric influences causing contraction, or to various other causes whereby the attached part may be at all times securely held in place.

In Figures 4 and 5 of the drawing, we have illustrated an alternative embodiment of the invention wherein the expanding member 5' of hard metal is provided with the conical or tapering end portion 8' as above described. In this case, however, the cylindrical longitudinally extending portion 9' of said member is relatively long. The expansion member 11' is first engaged upon the inner end of the portion 9' of the expanding member adjacent to the conical end 8' thereof. Then a hard metal expanding member 17 is loosely engaged upon the cylindrical portion 9', said member being similar in shape to the expanding end 8' of the member 5' and having the tapering or conical exterior surface 18. A second soft metal expansion member 19 is then engaged over the cylindrical portion 9 of the expanding member and against the smaller end of the conical surface 18 on the expanding member 17. Finally, the ram 19' is frictionally engaged upon the projecting end of the expanding member against the end of the latter expansion member 19. The several parts of the anchorage unit thus assembled, are inserted into the aperture or recess 14' in the masonry wall, which in this case is relatively deep. The ram is now driven inwardly upon the cylindrical portion 9' of the expanding member so that the two soft metal expansion sleeves 11' and 19 together with the interposed hard metal expanding member 17 are moved together upon the expanding member 5'. First the expansion member 11' as it is driven upon the conical surface 8' will be expanded and as said member is compressed against the wall of the aperture 14' it offers an increasing resistance to the longitudinal movement of the expanding member 17. The other expansion sleeve 19 is then driven longitudinally upon the conical surface 18 and is likewise expanded and the metal thereof caused to enter the irregularities of the aperture wall. Thus the two soft metal expansion members afford an extensive anchorage area with the wall of the aperture and will offer a sufficient resistance to withstand the most sever pulling strains which might devolve upon the expanding member 5'.

From the foregoing description considered in connection with the accompanying drawings, the construction and manner of use of the improved anchorage unit, will be clearly understood. In both of the described embodiments of the invention, the unit is marketed and sold to the individual user with the several component parts thereof including the ram, properly assembled for instant use so that it only remains for the user to provide the recess or aperture in the wall, place the unit therein and then drive the ram home in order to rigidly anchor the expanding member having the threaded bolt connections, in position. Thus the possible loss or displacement of the individual parts, as well as the consumption of time incident to the separate handling and assembling of the several parts is obviated. It is also to be noted that the anchorage unit is applied and secured in place without connecting the attaching bolt or screw thereto which has been necessary in prior devices of this character in order to provide a guide for the ram. In the present improvement the ram itself constitutes a component part of the anchorage unit and remains in assembled relation with the other parts thereof at all times.

While we have herein shown and described several practical and serviceable embodiments of the invention, it will nevertheless be understood that the device may be embodied in numerous other alternative forms and we, therefore, reserve the privilege of adopting all such legitimate changes in the form, construction and relative arrangement of the several parts as may be fairly embodied within the spirit and scope of the invention as claimed.

We claim:

1. An anchorage unit consisting of a plurality of permanently assembled elements comprising an expanding member, an expansion member movable relative thereto and a tubular ram frictionally engaged upon the expanding member and constituting a permanently connected component part of the anchorage unit.

2. As an improved article of manufacture, a composite anchorage unit, comprising a hard metal expanding member, a soft metal expansion member, and a ram, said ram having a frictional driving fit upon one end of the expanding member and retaining the unexpanded expansion member loosely thereon and in position to be engaged by said ram and expanded when the ram is driven home upon the expanding member.

3. As an improved article of manufacture, a composite anchorage unit comprising an expanding member of hard metal having an end portion provided with an exterior conical surface, a soft metal expansion member having a bore of uniform diameter loosely engaged upon the intermediate portion of said expanding member and a tubular ram having a tight frictional driving fit upon the other end of said expanding member to permanently retain said expansion member in assembled relation with said expanding member whereby the three parts may be handled as a single unit, said ram normally extending beyond the end of said expanding member and adapted to be driven thereon to move the soft metal expansion member upon the conical surface thereof, and said ram adapted to remain in place between the expanding member and the wall of the cavity in which the unit is anchored.

4. An anchorage unit consisting of a plurality of permanently assembled elements comprising a hard metal expanding member having a longitudinally threaded bore to receive an attaching bolt and provided at one of its ends with a conical exterior surface, the remaining exterior surface of said member extending in parallel relation to the axis thereof, an expansion member of relatively soft metal loosely engaged upon the latter surface of the expanding member and adapted to be driven upon the conical surface thereof, and a driving ram for said expansion member frictionally engaged upon the end of the expanding member and constituting a component part of the anchorage unit.

5. In an anchorage unit, an expanding member of hard metal having a longitudinally tapering peripheral surface at one of its ends, the exterior surface of said member for the remaining portion of its length extending in parallel relation to the axis thereof and said member having a longitudinally threaded bore to receive an attaching bolt, spaced soft metal expansion members loosely engaged upon the latter surface of said expanding member, an expanding cone of hard metal interposed between said expansion members, and a ram frictionally engaged upon the end of the first named expanding member and constituting a component part of the anchorage unit adapted to be driven longitudinally to simultaneously expand said expansion members.

In testimony that we claim the foregoing as our invention, and we have signed our names hereunder.

GOTTFRID KOHLER.
CHARLES B. SMITH